S. ROGERS.
SHOVEL HANDLE.
APPLICATION FILED APR. 24, 1908.

906,462.

Patented Dec. 8, 1908.

Witnesses
M. E. Fowler
James P. Mansfield

Inventor:
Samuel Rogers
By Alexander & Dowell
Attorneys

UNITED STATES PATENT OFFICE.

SAMUEL ROGERS, OF FORT PAYNE, ALABAMA, ASSIGNOR OF ONE-HALF TO ARTHUR ROGERS, OF BARNESVILLE, OHIO.

SHOVEL-HANDLE.

No. 906,462.  Specification of Letters Patent.  Patented Dec. 8, 1908.

Application filed April 24, 1908. Serial No. 428,902.

*To all whom it may concern:*

Be it known that I, SAMUEL ROGERS, of Fort Payne, in the county of Dekalb and State of Alabama, have invented certain new and useful Improvements in Shovel-Handles; and I hereby declare that the following is a full, clear, and exact description thereof, reference being had to the accompanying drawings, which form part of this specification.

This invention is a novel "dee" or hand-hold attachment for the handles of shovels, spades and the like. Its object is to provide a metal dee having the opposite sides formed preferably of two pieces of metal; each having its edge turned upon itself for about two-thirds of its length, and the other part or shank of each piece being curved to a little less than half a circle in cross-section, such curved portions or shanks being adapted to clench the end of a wooden handle between them; and the folded portions are bent to such shape as will form the proper size for a hand-hold; and the outer ends of such folded and curved portions are united by a hand-piece, which is preferably of wood secured to such portions by a through-bolt or rivet. The shank portions are fitted to the end of the wooden handle and secured thereto by rivets; but the shank portions are so bent that they do not entirely inclose the handle, their opposed edges being slightly separated, so that if the handle shrinks the rivets can be tightened and thus keep the dee rigidly attached to the handle.

The invention will be more clearly understood from the accompanying drawings forming part of this specification and the following detailed description thereof.

Figure 1:
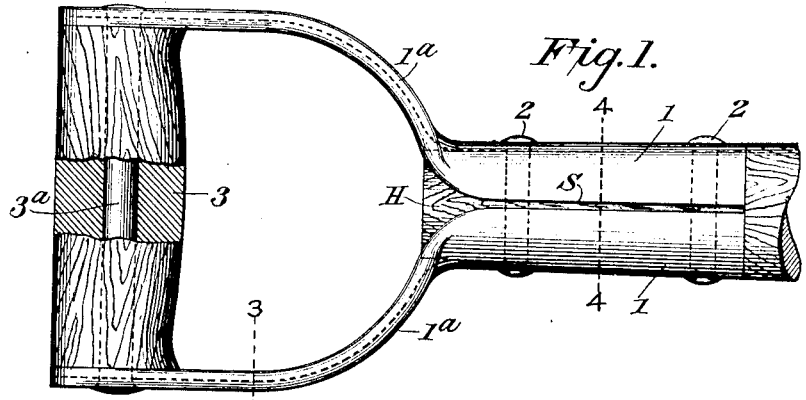
Figure 2:
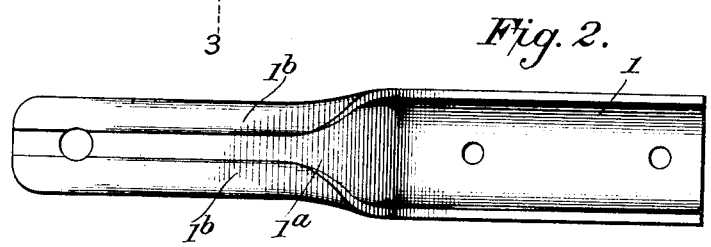
Figure 3:
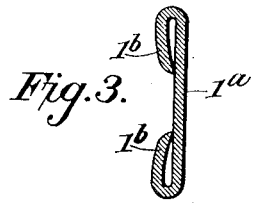
Figure 4:
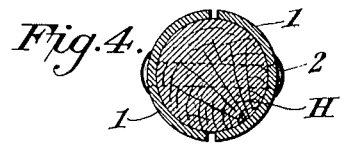
Figure 5:
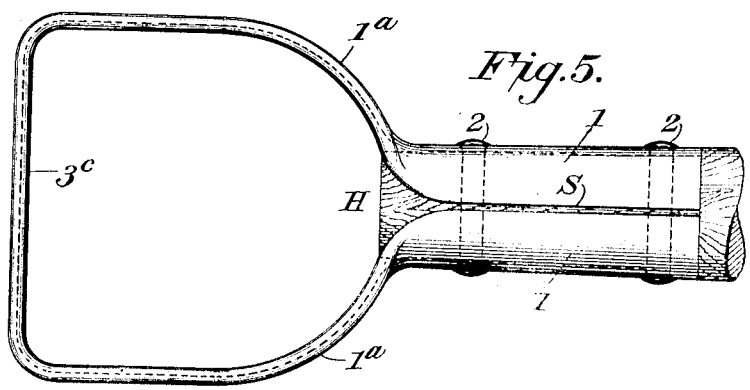

In said drawings—Figure 1 is a view of the complete preferred form of dee as attached to a handle. Fig. 2 is a view of one of the halves detached. Fig. 3 is a section through the dee on line 3—3, Fig. 1. Fig. 4 is a detail section on line 4—4, Fig. 1. Fig. 5 is a view of a modification.

In Figs. 1 to 4 of the drawings the hand-piece or dee comprises similar opposite members each having a shank portion 1 which is slightly less than a half circle in cross section, and they are adapted to be fitted to opposite sides of the end of a handle H and are fastened thereto by means of rivets 2, which transfix the handle and the opposite shanks 1. The shanks being slightly less than a half circle in cross section; their edges do not quite meet leaving a space as at S, Fig. 1, between their adjacent edges so that in event the handle shrinks the rivets can be tightened and thus the dee always kept fast and rigid on the handle.

The portions 1ª of the members projecting beyond the end of the handle are curved outwardly so as to approximate the form of an ordinary wooden dee; but both edges of these portions 1ª are bent inwardly upon the body of the portion 1ª as shown at 1ᵇ, so that the edges of the portions 1ª are of double thickness and consequently of greatly increased strength, and at the same time are less likely to chafe and injure the hands of the user.

The upper ends of the portions 1ª are connected by a hand-piece which, as shown in Fig. 1, comprises a wooden sleeve 3 transfixed by a bolt or rod 3ª, the ends of which transfix the ends of the portions 1ª and are riveted thereto as shown, thus firmly uniting said portions and securing the sleeve securely in position therebetween. This construction makes a very comfortable, strong and durable hand-piece and is applicable to a variety of handles, and can always be kept rigidly attached thereto by tightening up the rivets 2 if the handle shrinks.

As shown in Fig. 5 the hand-piece 3ᶜ may be made of metal and formed integrally with the members 1ª; thus the dee, as shown in Fig. 5, might be made of malleable iron, but has the split shank which makes it possible to readily tighten the same in case of shrinkage of the handle by tightening up the two rivets 2. This split shank is a very important feature of the invention and will be very useful in connection with malleable dees. The preferred form of shank however is that shown in Figs. 1 to 4.

Having described my invention what I claim as new and desire to secure by Letters Patent is:

1. A "dee" for shovel handles and the like comprising opposite similar members, each having a shank portion less than a half circle in cross section, and adapted to embrace one side of the handle, and each having a curved portion extending beyond the shank, said curved portion having its side edges flanged over upon itself, and a handpiece connecting the outer ends of the curved portions with means for securing the shank portions to the handle.

2. A "dee" for shovel handles consisting of a pair of similar wrought metal members each having a shank portion slightly less than a half circle in cross section, and a curved portion extending from the shank portion having inwardly turned flanges on its edges, said shank portions being fitted to opposite sides of the handle end, and a handpiece attached to the outer ends of said curved portions with means for securing the shank portions to the handle, for the purpose set forth.

3. A "dee" for shovel handles consisting of a pair of similar sheet or wrought metal members each having a shank portion slightly less than a half circle in cross section and a curved portion extending from the shank portion having inwardly turned flanges on its edges, said shank portions being adapted to be fitted to opposite sides of the handle end, a rod riveted to the outer ends of said curved portions, a sleeve on said rod, and rivets transfixing the shanks and handle end, for the purpose set forth.

In testimony that I claim the foregoing as my own, I affix my signature in presence of two witnesses.

SAMUEL ROGERS.

Witnesses:
G. COLESTON,
W. B. GARVIN.